United States Patent
Joseph

(10) Patent No.: US 10,674,870 B1
(45) Date of Patent: Jun. 9, 2020

(54) FOOD CHILLING DEVICE HAVING PIVOTALLY COUPLED COMPARTMENT

(71) Applicant: Dana Joseph, Crane, MO (US)

(72) Inventor: Dana Joseph, Crane, MO (US)

( * ) Notice: Subject to any disclaimer, the term of this patent is extended or adjusted under 35 U.S.C. 154(b) by 0 days.

(21) Appl. No.: 15/269,387

(22) Filed: Sep. 19, 2016

Related U.S. Application Data

(60) Provisional application No. 62/220,004, filed on Sep. 17, 2015.

(51) Int. Cl.
| | |
|---|---|
| *F25D 11/00* | (2006.01) |
| *F25D 23/06* | (2006.01) |
| *A47J 41/00* | (2006.01) |
| *F25B 1/00* | (2006.01) |

(52) U.S. Cl.
CPC .......... *A47J 41/005* (2013.01); *A47J 41/0072* (2013.01); *F25B 1/00* (2013.01); *F25D 11/00* (2013.01); *F25D 23/06* (2013.01); *F25D 23/069* (2013.01)

(58) Field of Classification Search
CPC ........ F25D 11/00; F25D 11/003; F25D 23/06; F25D 23/062; F25D 23/069
See application file for complete search history.

(56) References Cited

U.S. PATENT DOCUMENTS

| | | | |
|---|---|---|---|
| 2,603,071 A * | 7/1952 | Kalhoefer | F25D 11/00 62/229 |
| 2,671,603 A | 3/1954 | Bauer | |
| 4,006,606 A | 2/1977 | Underdue | |
| D286,124 S | 10/1986 | Dempsey | |
| 5,718,124 A | 2/1998 | Senecal | |
| 6,799,433 B1 | 10/2004 | Gleason et al. | |
| 7,225,633 B2 | 6/2007 | DeMars | |
| 7,308,796 B1 | 12/2007 | Eager | |
| 8,061,148 B2 | 11/2011 | Ethier et al. | |
| 2005/0005612 A1* | 1/2005 | Kennedy | A47J 27/004 62/3.3 |
| 2009/0071969 A1* | 3/2009 | Lopez | A47G 19/22 220/592.17 |

OTHER PUBLICATIONS

Extruflex, Plastic Materials & Thermal Insulation, Jun. 2008.*

* cited by examiner

*Primary Examiner* — Edward F Landrum
*Assistant Examiner* — Daniel C Comings
(74) *Attorney, Agent, or Firm* — Cramer Patent & Design, PLLC; Aaron R. Cramer

(57) ABSTRACT

A food chilling device includes a container body defining a container interior volume configured to contain foodstuff, a lid configured to cover the container interior volume, at least one compartment pivotally coupled to the container body and defining a compartment interior volume configured to contain additional foodstuff, and a refrigeration system coupled to the container body and configured to cool the foodstuff contained within the container interior volume and the additional foodstuff contained within the compartment interior volume.

11 Claims, 3 Drawing Sheets

FOOD CHILLING DEVICE HAVING PIVOTALLY COUPLED COMPARTMENT

RELATED APPLICATIONS

The present invention claims the benefit of U.S. Provisional Application No. 62/220,004 filed on Sep. 17, 2015, the entire disclosures of which are incorporated herein by reference.

FIELD OF THE INVENTION

The present invention relates generally to the field of containers and, more particularly, to a temperature-controlled food chilling container.

BACKGROUND OF THE INVENTION

Home parties, events, and barbeques often feature a mixture of warm and cold foods that require temperature control to prevent growth of bacteria associated with foodborne illness. Such cold foods may include mayonnaise as an ingredient for potato salad, macaroni salad, and coleslaw. Fruit salads or condiments, such as salad dressing and dips for various chips, are also susceptible to bacterial contamination that results in guests becoming ill from food poisoning. Foodborne illness is a common, and preventable public health problem caused by consuming contaminated foods or beverages. Guidelines for preventing foodborne contamination of cold foods include covering food items, using a food thermometer to measure the food's internal temperature every two hours, and disposing of the food item when the temperature of a cold food item rises above forty-one degrees Fahrenheit (41° F.).

Rather than repeatedly measuring the temperature of cold foods during an event, often times hosts may improvise a cooling station by placing a bowl of cold food inside a larger bowl filled with ice, or provide smaller serving bowls, thus requiring numerous trips to refill the bowl, which may already be harboring bacteria. Other hosts may opt to provide food items that are less likely to grow bacteria, although this may deprive guests of favorite dishes and may not actually prevent guests from becoming ill from warm food. Food waste occurs from having to dispose of food that has been left out too long or that is not eaten by guests. This is not desirable.

Accordingly, there exists a need for a temperature-controlled food chilling device that addresses the disadvantages described above.

SUMMARY OF THE INVENTION

The inventor has recognized the aforementioned inherent problems and lack in the art and observed that there is a need for a reliable food chilling device that avoids the above-mentioned disadvantages. The development of the present invention, which will be described in greater detail herein, fulfills this need.

In an exemplary embodiment, the disclosed food chilling device includes a container body defining a container interior volume configured to contain foodstuff, a lid configured to cover the container interior volume, and a refrigeration system coupled to the container body and configured to cool the foodstuff contained within the container interior volume.

In another exemplary embodiment, the disclosed food chilling device includes a container body defining a container interior volume configured to contain foodstuff, a lid configured to cover the container interior volume, at least one compartment pivotally coupled to the container body and defining a compartment interior volume configured to contain additional foodstuff, and a refrigeration system coupled to the container body and configured to cool the foodstuff contained within the container interior volume and the additional foodstuff contained within the compartment interior volume.

In another exemplary embodiment, the disclosed food chilling device including a container body defining a container interior volume configured to contain foodstuff, the container body comprising a double-walled sidewall defining a cold chamber, a base mounted to and configured to support the container body, a lid configured to cover the container interior volume, and a refrigeration system thermally coupled to the container body and configured to cool the foodstuff contained within the container interior volume, wherein the refrigeration system is at least partially disposed within the base and at least partially disposed within the cold chamber.

In yet another exemplary embodiment, the disclosed a food chilling device including a container body defining a container interior volume configured to contain foodstuff, the container body comprising a thermally conductive inner wall and a thermally insulative outer wall, wherein the inner wall and the outer wall are spaced apart to define a cold chamber therebetween, a base mounted to and configured to support the container body, a lid configured to cover the container interior volume, at least one (1) compartment pivotably coupled to the container body, the compartment comprises a thermally insulative front wall and a thermally conductive back wall defining a compartment interior volume configured to contain additional foodstuff, and a refrigeration system thermally coupled to the container body and configured to cool the foodstuff contained within the container interior volume and the additional foodstuff contained within the compartment interior volume, wherein the refrigeration system includes a compressor disposed within the base, a condenser coil coupled to the compressor and disposed within the base, an expansion valve coupled to the condenser coil and disposed within the base, and an evaporator coil coupled to the compressor and disposed within the cold chamber around the inner wall.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

| | |
|---|---|
| 10 | food chilling device |
| 12 | container body |
| 14 | container interior volume |
| 15 | sidewall |
| 16 | upper edge |
| 18 | locking mechanism |
| 20 | base |
| 21 | side handle |
| 22 | hinge |
| 24 | cold chamber |
| 25 | container lid |
| 26 | lid center handle |
| 27 | lid side handle |
| 28 | compartment interior volume |
| 30 | compartment |
| 31 | compartment lid |
| 32 | compartment handle |
| 33 | groove |
| 34 | bottom edge |
| 36 | hinge |
| 38 | inner wall |
| 40 | outer wall |
| 42 | refrigeration system |
| 44 | outer wall rim |
| 46 | inner wall rim |
| 48 | container |
| 50 | power switch |
| 52 | compartment opening |
| 54 | thermal seal |
| 56 | base cavity |
| 58 | thermal seal |
| 60 | evaporator coil |
| 62 | compressor |
| 64 | condenser coil |
| 66 | fan |
| 68 | vent |
| 70 | expansion valve |
| 72 | fan |
| 74 | power cord |
| 76 | power supply |
| 78 | front wall |
| 80 | back wall |
| 82 | hinge |

DETAILED DESCRIPTION OF THE PREFERRED EMBODIMENT

Figure 1:
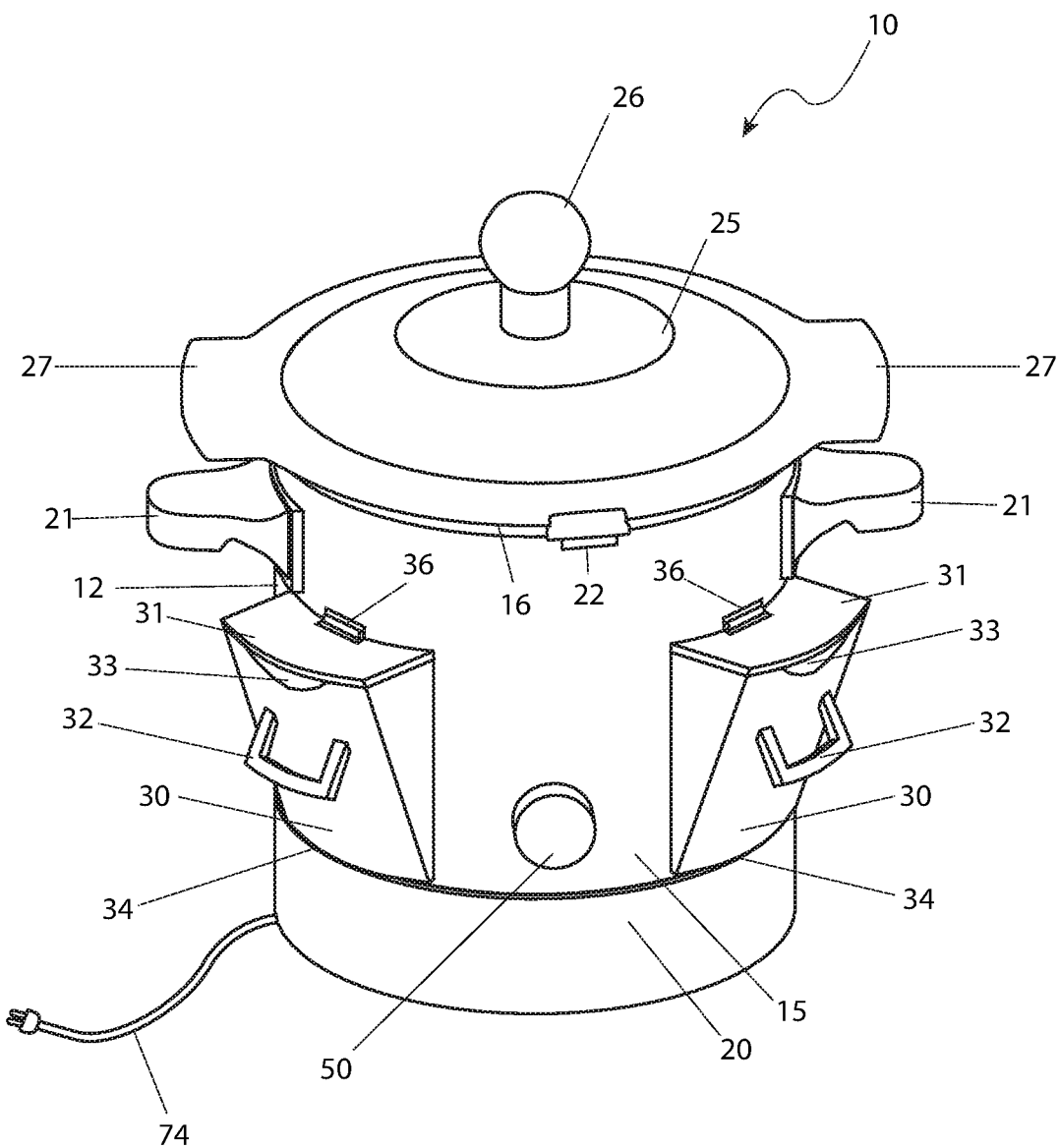
FIG. 1 is a front perspective view of an embodiment of the disclosed food chilling device.
Figure 2:
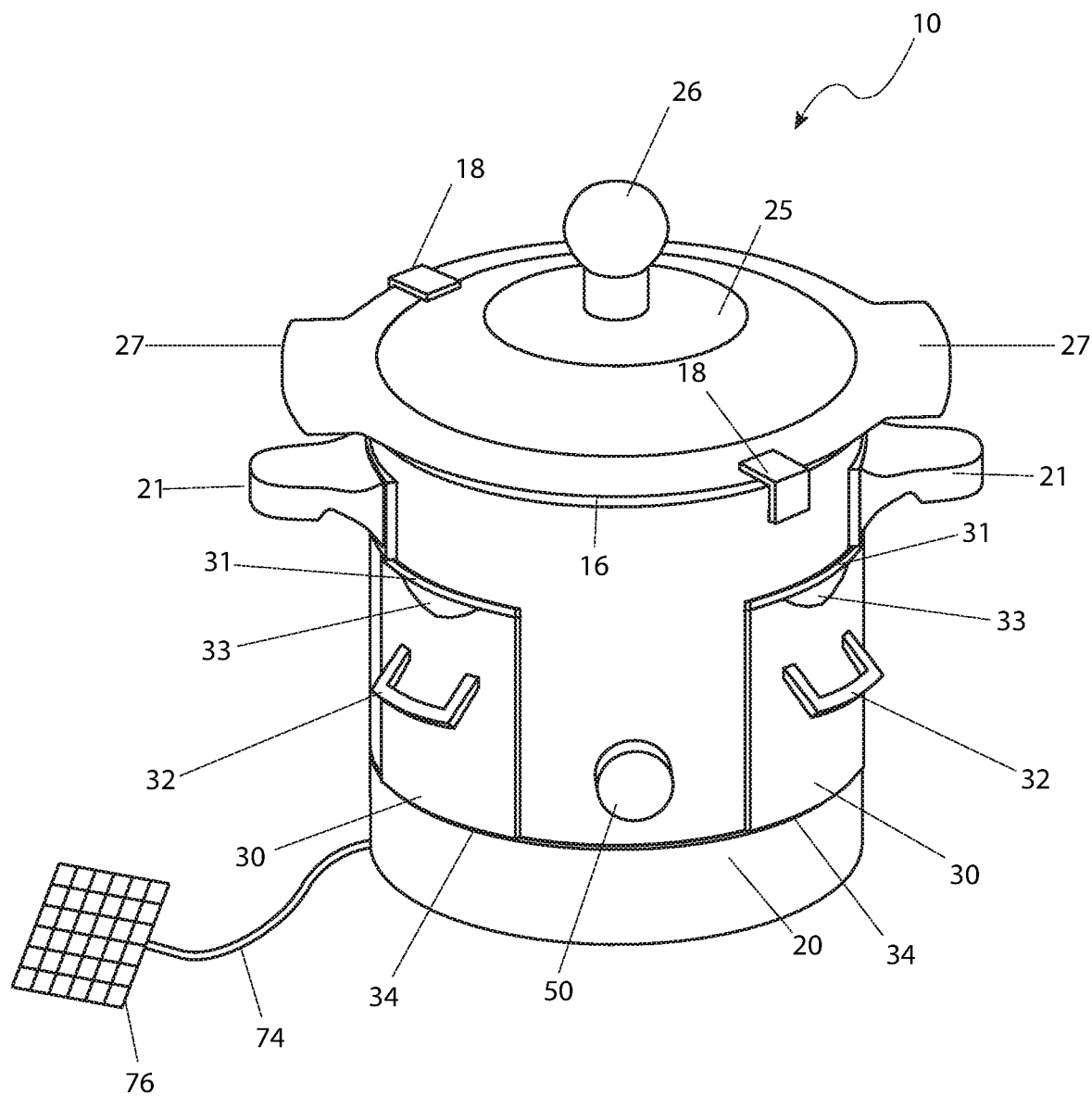
FIG. 2 is another front perspective view of the disclosed food chilling device; and, FIG. 3 is a side elevation view in section of the disclosed food chilling device.
Figure 3:
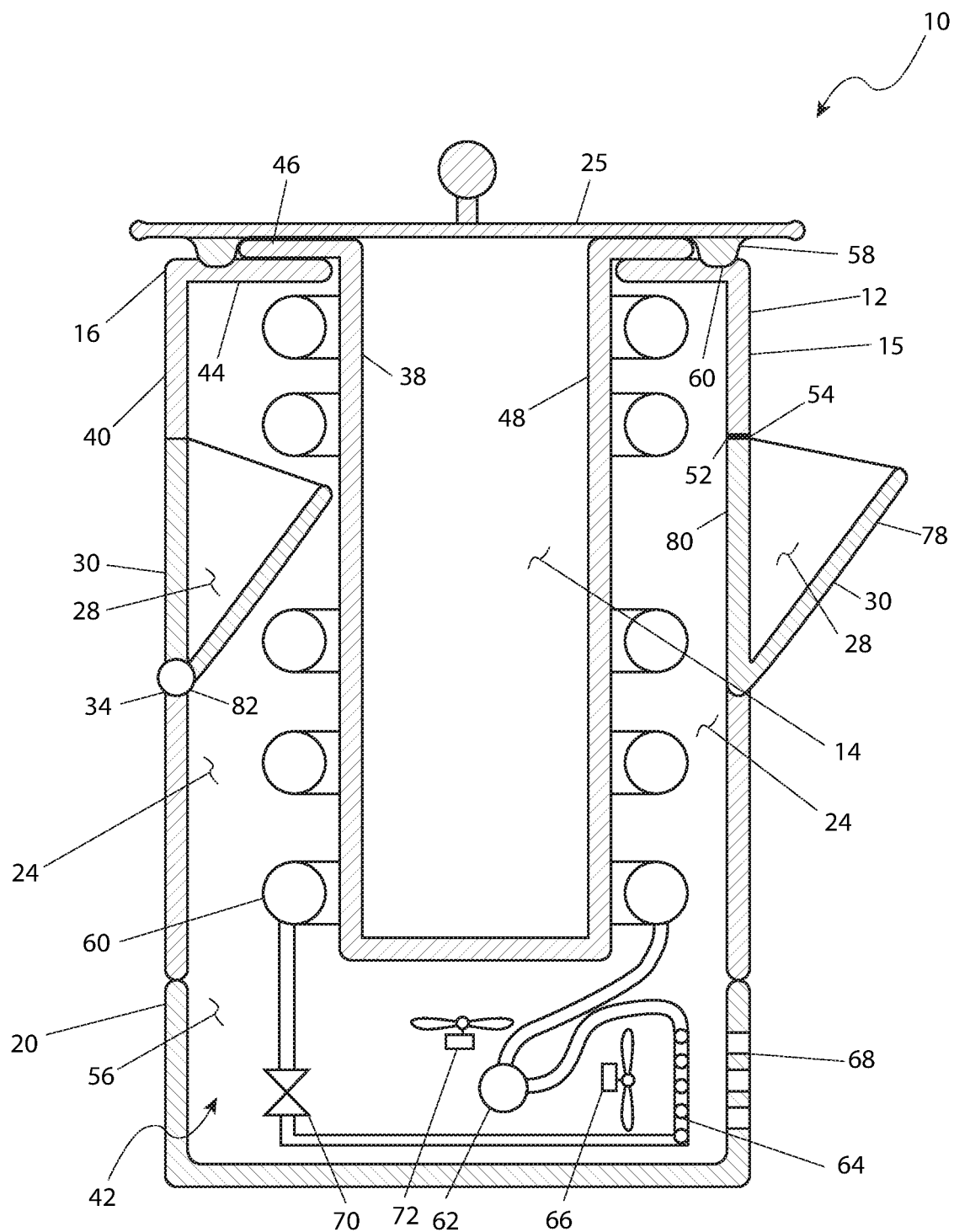

In accordance with the invention, the best mode is presented in terms of exemplary embodiments, herein depicted within FIGS. 1-3. However, the invention described herein is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

Referring to FIGS. 1-3, disclosing a food chilling device, herein generally referred to as a device 10, where like reference numerals represent similar or like parts. The disclosed device 10 provides for extended storage and service of chilled foodstuffs. In various embodiments, the device 10 takes the form of and is suitably sized as a countertop or tabletop serving container for chilled foodstuffs. For example, the device 10 is designed and configured to be portable for conveniently holding foodstuffs or other food items in a chilled or refrigerated condition on a counter or table for an extended period of time.

The device 10 may take various different configurations. While the illustrated embodiments show the device 10 as having a generally circular-shaped configuration, in other embodiments, the device 10 may have a rectangular-shaped configuration, a square-shaped configuration and the like.

FIG. 1 is a schematic illustration of a front perspective view of an exemplary embodiment of the disclosed device. FIG. 2 is a schematic illustration of another front perspective view of the disclosed device. In the exemplary embodiment, the device 10 includes container body 12 and a base 20. Generally, the container body 12 serves as a food cooling and storage vessel. The base 20 forms a lower portion of and serves as a support for the container body 12.

The device 10 also includes a container lid 25. The container lid 25 is configured to be placed over top of the container body 12 and supported by an upper edge of the container body 12 to cover any foodstuffs contained within the container body 12. In certain embodiments, the container lid 25 forms a substantially airtight seal between it and the container body 12. In an example embodiment, the container lid 25 may removable from an upper edge of the container body 12 such that the container lid 25 can be completely removed to access the foodstuff contained within the container body 12. In another example embodiment, the container lid 25 may be hingedly connected to the container body 12, for example, by one or more hinges 22 (FIG. 1), such that the container lid 25 can be opened to access the foodstuff contained within the container body 12.

In the illustrated embodiment, the container lid 25 may include a pair of diametrically opposing side handles 27 extending radially outward. The container lid 25 may also, or alternatively, include and a centrally disposed center handle 26 extending perpendicularly upward.

In various embodiment, the container lid 25 may include a locking mechanism 18 (FIG. 2) to secure the container lid 25 to the container body 12. As examples, the locking mechanism 18 may include a latch, a clamp, or any other suitable securing means that prevents the container lid 25 from unintentionally being removed from the container body 12.

The container body 12 includes a continuous double-walled sidewall 15 that defines a hollow interior volume 14 (FIG. 3). In the circular-shaped configuration, as illustrated, the double-walled sidewall 15 is a circumferential wall. The device 10 is configured to hold an amount of various different types of foodstuff (not shown) within the interior volume 14 of the container body 12. The double-walled sidewall 15 defines a cold chamber 24 (FIG. 3) configured to retain chilled air to keep the foodstuff held within the interior volume 14 of the container body 12 in the refrigerated condition. The container body 12, for example, the double-walled sidewall 15, includes an upper edge 16 configured to support the lid 25.

The device 10 also includes at least two (2) side handles 21 extending outward from the container body 12 to aid in lifting and/or moving the device 10. In an example embodiment, the side handles 21 are spaced apart at diametrically opposing locations on the container body 12.

The device 10 also includes at least one (1) openable and closable compartment 30. In the illustrated embodiment, the device 10 includes two (2) compartments 30, however, in other embodiments, the device 10 may include any number of compartments 30. The compartment 30 may be accessed from the exterior of the container body 12 and provides access to additional foodstuff stored within the compartment 30.

As illustrated in FIGS. 1 and 2, each compartment 30 may move, for example tilt or pivot, in relation to the double-walled sidewall 15 of the container body 12 for ease of use and access to the foodstuff contained inside. When in the closed position, as illustrated in FIG. 2, each compartment 30, extends inwardly into the container body 12 such that the compartment 30 is in thermal communication with and is chilled by the cold chamber 24. When in the open position, as illustrated in FIG. 1, each compartment extends outwardly from the container body 12 such that a container interior volume 28 (FIG. 3) of the compartment 30 holding additional foodstuffs can be accessed.

In an example embodiment, each compartment 30 has a generally wedge shaped, when viewed from the side in cross-section, defining the compartment interior volume 28. As an example, the compartment 30 includes a front wall, a back wall, an opposed pair of sidewalls and an open top. In an example embodiment, a bottom, or lower, edge 34, for example, the edge formed by convergence of the front wall and the back wall, is hingedly attached to the double-walled sidewall 15 of the container body 12, for example, by hinge 82. As such, the compartment 30 can be pivoted out from and into the container body 12 when opened and closed.

In an example embodiment, each compartment 30 may also include a compartment lid 31 configured to cover the open top of the compartment 30 and enclose the compartment interior volume 28. Opening the compartment lid 31 may provide access to compartment interior volume 28 in order to add foodstuff to the compartment 30 or remove foodstuff from the compartment 30. In an example embodiment, the compartment lid 31 may be removable from the compartment 30 such that the compartment lid 31 can be completely removed to access the additional foodstuff contained within the compartment 30. As an example, the compartment lid 31 may be rest on and be supported by upper edges of the front wall, the back wall and the sidewalls of the compartment 30. In another example embodiment, the compartment lid 31 may be hingedly connected to the compartment 30, for example, by one (1) or more hinges 36 (FIG. 1), such that the compartment lid 31 can be opened to access the additional foodstuff contained within the compartment 30. As an example, the compartment lid 31 may be hingedly attached at an upper edge of the back wall of the compartment 30.

In an example embodiment, each compartment 30 may include a groove 33, or recess, formed in the upper edge of the front wall and located adjacent to the compartment lid 31 to provide a means to grip the compartment lid 31 to assist in the removal or opening of the compartment lid 31.

In an example embodiment, each compartment 30 may also include a compartment handle 32 connected to or otherwise disposed on the outer surface of the front wall of the compartment 30 to assist in opening and closing the compartment 30.

FIG. 3 is a schematic illustration of a side elevation view, in section, of the disclosed device 10, according to an exemplary embodiment. The double-walled sidewall 15 of the container body 12 includes an inner wall 38 and an outer wall 40. The cold chamber 24 is defined between the inner wall 38 and the outer wall 40. The device 10 also includes a refrigeration system 42 configured to chill the air disposed within the cold chamber 28 and, thus, chill the foodstuffs contained within the interior volume 14 of the container body 12 and the additional foodstuffs contained within the interior volume 28 of the compartments 30. The refrigeration system 42 is configured to maintain the foodstuff contained within the container 48 (e.g., the interior volume 14) and the compartment 30 (e.g., the interior volume 28) below approximately forty-one degrees Fahrenheit (41° F.).

The outer wall 40 is a thermally insulating wall. As an example, the outer wall 40 includes or is made from a thermally insulative material. As an example, the outer wall 40 may be made of a thermally insulative ceramic. As another example, an interior surface of the outer wall 40 may be coated with an insulative material or an insulative material may be attached to the interior surface of the outer wall 40. As an example, a thermally insulative ceramic or foam layer may be applied to the interior surface of the outer wall 40.

The inner wall 38 is a thermally conductive wall. As an example, the inner wall 38 includes or is made from a thermally conductive material. As an example, the inner wall 38 may be made of a thermally conductive metal, such as aluminum or copper. As another example, the inner wall 38 may be made from a thermally conductive polymer, such as a thin plastic.

In an example embodiment, the inner wall 38 is affixed (e.g., permanently attached) to the outer wall 40, for example, along the upper edge 16 of the double-walled sidewall 15 of the container body 12. As such, the inner wall 38 defines an integral container interior volume 14 that serves as the food chilling and storage container. In another example embodiment, the inner wall 38 is removable (e.g., removably attached) to the outer wall 40. For example, an upper edge of the outer wall 40 may include an inwardly protruding outer wall rim 44 and an upper edge of the inner wall 38 may include an outwardly protruding inner wall rim 46. The outer wall rim 44 may define a shoulder than supports the inner wall rim 46. As such, the inner wall 38 may form or define a removable container 48. The container 48 formed by the inner wall 38 defines a removable container interior volume 14 that serves as the food chilling and storage container.

The container body 12 also includes one or more compartment openings 52 formed through the outer wall 40. The compartment opening 52 is suitably sized receive the compartment 30. A perimeter of the compartment opening may include a thermal seal 54 that engages the perimeter of the compartment 30, when in both the open and closed positions, in order to retain cold air within the cold chamber 24.

The distance between the inner wall 38 and the outer wall 40 is suitably sized to accommodate the compartment 30 when in the closed position. In an example embodiment, the inner wall 38 may be contoured or otherwise suitably shaped to accommodate the compartment 30 when in the closed position.

In an example embodiment, the front wall 78 of the compartment 30 includes or is made from the thermally insulative material, such as described herein for the outer wall 40. The back wall 80 of the compartment 30 includes or is made from the thermally conductive material, such as described herein for the inner wall 38.

In an example embodiment, the container lid 25 includes a thermal seal 58. The thermal seal 58 is configured to engage the upper edge 16 of the container body 12 in order to retain cold air within the cold chamber 24. As an example, the thermal seal 58 may be connected to an underside surface of the container lid 25. As examples, the thermal seal 58 may be a gasket or annular seal that engages the upper edge of the double-walled sidewall 15 of the container body 12. In an example embodiment, the outer wall rim 44 may include an annular recess 60 configured to engage and partially receive the thermal seal 58 of the container lid 25.

In an example embodiment, the base 20 defines a hollow internal base cavity 56. The base cavity 56 is configured to house a majority of the refrigeration system 42. The refrigeration system 42 includes a compressor 62 configured to constrict a refrigerant vapor, such as refrigerants R-12, R-13B1, R-22, R-502, and R-503, commonly referred to as Freon®, or similar refrigerant, raising its pressure. The compressor 62 is connected to a condenser coil 64. The pressurized refrigerant is pushed from the compressor 62 to the condenser coil 64 where it is cooled and becomes a liquid refrigerant. The refrigeration system 42 may also include a fan 66 that forces air over the condenser coil 64 to aid in cooling of the refrigerant. The heated air is forced out of the base 20 through a vent 68 formed in the base 20. The condenser coil 64 is connected to an expansion valve 70. The expansion valve 70 expands the liquid refrigerant into a low pressure liquid or gas refrigerant. The expansion valve 70 is connected to an evaporator coil 60, or cooling coil, disposed within the cold chamber 24 defined between the inner wall 38 and the outer wall 40. The evaporator coil 60 absorbs heat from within the cold chamber 24. The evaporator coil 60 is connected to the compressor 62, where the refrigeration cycle starts again. The refrigeration system 42 may also include another fan 72 that forces air over the evaporator coil 60 to circulate the air within the cold chamber 24 and aid in removing heat from the interior volume 14 of the container 48 and the interior volume 28 of the compartments 30.

As illustrated in FIG. 3, the evaporator coil 60 may be disposed within the cold chamber 24 between the inner wall 38 and the outer wall 40. The evaporator coil 60 may extend from the base 20, or a lower end of the container body 12, to an upper end of the container body 12. The evaporator coil 60 may be wrapped around the inner wall 38. The evaporator coil 60 is arranged and configured to not interfere with the compartments 30 when in the closed position.

Referring again to FIGS. 1 and 2, the device 10 also includes a power cord 74 extending from and electrically connected to the refrigeration system 42 for powering the device 10. As an example, the power cord 74 may be configured to be connected to a household 110-volt electrical outlet, as illustrated in FIG. 1. As another example, the power cord 74 may be configured to be connected to an alternative power supply 76, such as a solar cell, a battery, a 12-volt DC vehicle outlet and the like.

The device 10 also includes a power switch 50. The power switch 50 is disposed on an exterior of the container body 12 and is electrically coupled to the refrigeration system 42. The power switch 50 also serves as a thermostat or other temperature control mechanism to control the temperature within the cold chamber 24.

Those skilled in the art will recognize that other styles and configurations of the disclosed device 10 can be easily incorporated into the teachings of the present disclosure, and only particular configurations have been shown and described for purposes of clarity and disclosure and not by way of limitation of scope.

The foregoing descriptions of specific illustrated embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. A food chilling device, comprising:
a container body comprising an inner wall defining a container interior volume configured to contain foodstuff, and an outer wall, wherein said inner wall and said outer wall are spaced apart to define a cold chamber between said inner wall and said outer wall, said cold chamber surrounding said container interior volume, said inner wall comprises a thermally conductive material;
a lid configured to cover said container interior volume, said lid includes a centrally disposed center handle extending perpendicularly upward;
at least one compartment pivotally coupled to said outer wall of said container body and defining a compartment interior volume configured to contain additional foodstuff, wherein said compartment is pivotable relative to said outer wall between a first pivotal orientation in which said compartment interior volume is located within said cold chamber and a second pivotal orientation in which said compartment interior volume is located outside of said outer wall;
a refrigeration system coupled to said container body and configured to cool said foodstuff contained within said container interior volume and to cool said additional foodstuff contained within said compartment interior volume;
at least two side handles extending outward from the container body to aid in lifting and/or moving the food chilling device;
wherein said inner wall is removable from said outer wall such that said inner wall forms a container further defining said container interior volume;
wherein:
said compartment comprises a front wall and a back wall defining said compartment interior volume, wherein said walls further define an opening whereby said compartment interior volume lacks a top:
when said compartment is pivoted in said first pivotal orientation, said front wall of said compartment is aligned with said outer wall of said container body; and,
when said compartment is pivoted in said second pivotal orientation, said back wall of said compartment is aligned with said outer wall of said container body;
wherein said refrigeration system comprises:
a compressor;
a condenser coil coupled to said compressor;
an expansion valve coupled to said condenser coil; and,
an evaporator coil coupled to said compressor.

2. The device of claim 1, wherein said outer wall comprises a thermally insulative material.

3. The device of claim 1, wherein at least a portion of said refrigeration system is disposed within said cold chamber between said inner wall and said outer wall.

4. The device of claim 1, further comprising a base, wherein said container body is mounted to said base, and wherein said refrigeration system is at least partially disposed within said base.

5. The device of claim 1, wherein said front wall comprises a thermally insulative material.

6. The device of claim 5, wherein said back wall comprises a thermally conductive material.

7. The device of claim 1, wherein said front wall and said back wall converge at a lower edge of said compartment, opposite said open top, such that said compartment has a wedge shape in cross section.

8. The device of claim 7, wherein said lower edge of said compartment is hingedly connected to said container body.

9. The device of claim 1, wherein said lid comprises a thermal seal configured to mate with said container body.

10. A food chilling device, comprising:
- a container body comprising an inner wall defining a container interior volume configured to contain foodstuff, and an outer wall, wherein said inner wall and said outer wall are spaced apart to define a cold chamber between said inner wall and said outer wall, said cold chamber surrounding said container interior volume, said inner wall comprises a thermally conductive material and said outer wall comprises a thermally insulative material;
- a base mounted to and configured to support said container body;
- a lid configured to cover said container interior volume, said container lid includes a centrally disposed center handle extending perpendicularly upward;
- at least one compartment pivotally coupled to said outer wall of said container body and defining a compartment interior volume configured to contain additional foodstuff, wherein said compartment is pivotable relative to said outer wall between a first pivotal orientation in which said compartment interior volume is located within said cold chamber and a second pivotal orientation in which said compartment interior volume is located outside of said outer wall; and,
- a refrigeration system thermally coupled to said container body and configured to cool said foodstuff contained within said container interior volume and to cool said additional foodstuff contained within said compartment interior volume, wherein said refrigeration system is at least partially disposed within said base and at least partially disposed within said cold chamber; and
- at least two side handles extending outward from the container body to aid in lifting and/or moving the food chilling device.

11. A food chilling device comprising:
- a container body comprising a thermally conductive inner wall defining a container interior volume configured to contain foodstuff, and a thermally insulative outer wall, wherein said inner wall and said outer wall are spaced apart to define a cold chamber between said inner wall and said outer wall, said cold chamber surrounding said container interior volume;
- a base mounted to and configured to support said container body;
- a lid configured to cover said container interior volume, said container lid includes a centrally disposed center handle extending perpendicularly upward;
- at least one compartment pivotally coupled to said outer wall of said container body, said compartment comprises a thermally insulative front wall and a thermally conductive back wall defining a compartment interior volume configured to contain additional foodstuff, wherein said compartment is pivotable relative to said outer wall between a first pivotal orientation in which said compartment interior volume is located within said cold chamber and a second pivotal orientation in which said compartment interior volume is located outside of said outer wall; and,
- a refrigeration system thermally coupled to said container body and configured to cool said foodstuff contained within said container interior volume and said additional foodstuff contained within said compartment interior volume, wherein said refrigeration system comprises:
- a compressor disposed within said base;
- a condenser coil coupled to said compressor and disposed within said base;
- an expansion valve coupled to said condenser coil and disposed within said base; and,
- an evaporator coil coupled to said compressor and disposed within said cold chamber around said inner wall; and
- at least two side handles extending outward from the container body to aid in lifting and/or moving the food chilling device.

\* \* \* \* \*